June 8, 1965  K. WILFERT  3,187,710

PASSENGER CAR BODY

Filed March 15, 1963

INVENTOR
Karl Wilfert

BY  Dicke & Craig

ATTORNEYS

3,187,710
PASSENGER CAR BODY
Karl Wilfert, Stuttgart-Degerloch, Germany, assignor to Daimler-Benz Aktiengesellschaft, Stuttgart-Unterturkheim, Germany
Filed Mar. 15, 1963, Ser. No. 265,474
Claims priority, application Germany, Mar. 20, 1962, D 38,407
2 Claims. (Cl. 116—28)

The present invention relates to a passenger car and it is its principal object to provide a car body which is designed so that the lower part thereof has such a shape that its interior may be fully utilized without leaving any unused gaps, that due to this shape the total length of the car will be as short as possible and the car may be very easily maneuvered in dense traffic and especially into and out of small parking areas and that—also due to this shape—the front and rear ends of the lower body and particularly the sensitive latter edges thereof are protected as much as possible from being damaged in collisions. The lower part of the car body should further be designed so as to offer a low wind resistance and to have a pleasing appearance.

The above-mentioned object is attained according to the invention by making the lower part of the car body of such a shape, as seen in a plan view, that the central parts of the front and rear end walls thereof extend substantially in a straight line transverse to the longitudinal axis of the car, while the lateral parts of these end walls are inclined toward the center of the car.

Especially in connection with the above-mentioned object according to which a car body is to be designed of such a shape that it is thereby specially protected from damage in collisions, the invention further provides additional protective means in the form of bumper bars in accordance with the shape of the front and rear ends of the car. Further objects of the invention are to provide at least one of the bumpers, preferably the rear bumper, with an additional shock absorber and a pressure-operated signal device between this shock absorber and the central part of the bumper.

The features and advantages of the present invention will become more clearly apparent from the following detailed description thereof which is to be read with reference to the accompanying drawings, in which—

FIGURE 3 shows a cross section which is taken along line III—III of FIGURE 2;

FIGURE 4 shows a cross section which is taken along line IV—IV of FIGURE 2; while FIGURE 5 shows a cross section which is taken along line V—V of FIGURE 2.

Figure 1:
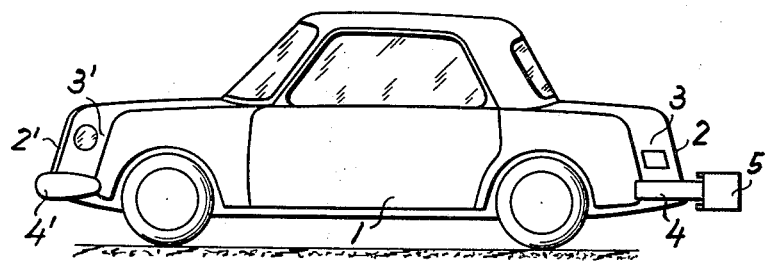
FIGURE 1 shows a side view of a car with a lower body according to the invention.
Figure 2:
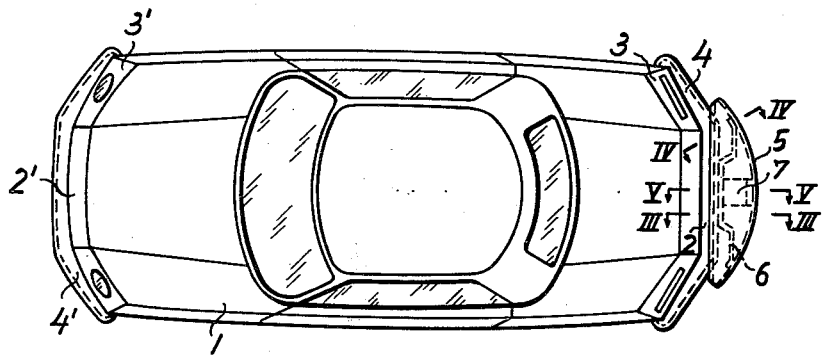
FIGURE 2 shows a top view of the car according to FIGURE 1.
Figure 2:
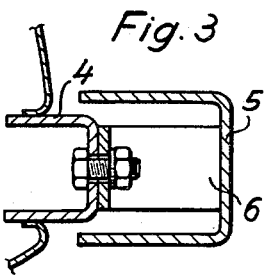
Figure 2:
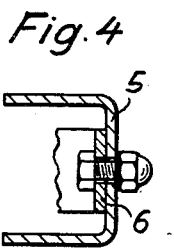
Figure 2:
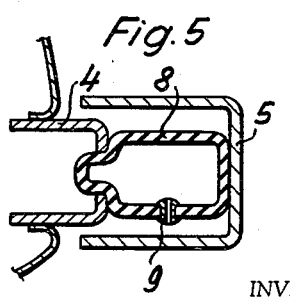

As illustrated in FIGURES 1 and 2, each of the opposite end walls of the lower part 1 of the car body consists of a central part 2 or 2' extending transversely to the longitudinal axis of the car and lateral parts 3 or 3' on the respective central part which are inclined toward the center of the car. The contours of the parts 2' and 3' of the front end wall are substantially straight and those of the parts 2 and 3 of the rear end wall are absolutely straight.

The front and rear ends of the car carry bumpers 4' and 4, respectively, which extend substantially parallel to the contours of the end walls. Extending laterally slightly beyond the central part of the rear bumper 4, an additional shock absorber 5 of an arcuate shape secured to this central part of bumper 4 by means of one or more leaf springs 6. As illustrated particularly in FIGURE 5, the central part of the gap between bumper 4 and shock absorber 5 contains a signal device 7 which may consist, for example, of a hollow flexible container 8 of rubber with a whistle 9 in its wall. If, when backing the car, the shock absorber 5 engages with an obstacle, for example, the front end of another car and is thereby compressed, the rubber container 8 will be likewise compressed so that the air is forced out of this container through the whistle 9 and the latter will then give a warning signal. Of course, in place of this rubber whistle 8, 9 it is also possible to provide any other suitable signal device or an electric contact device which is connected to an acoustic or optical signal device at the inside of the car. If desired, a similar shock absorber and signal device may also be mounted on the front bumper 4'.

The present invention is not limited to the particular embodiment as illustrated. Thus, for example, the inclined ends of the bumpers may be extended and bent at an obtuse angle toward and along the sides of the car and may even reach up to the wheel edges of the fenders. For further protection of the car, the shock absorber 5 may also be connected to the bumper by energy-dissipating or deformable means, for example, in the form of a simple metallic bellows.

Having thus fully described my invention, what I claim is:

1. A passenger car having a lower body which as seen in plan view comprises an end wall, said end wall having a central part extending rectilinearly and transversely to the longitudinal axis of the car, said end wall further comprising lateral parts, said lateral parts extending in straight lines and forming with the respective ends of said central part obtuse angular structures, and a bumper adjacent said end wall and having contours extending substantially parallel to the contours of said central and lateral parts, said bumper including further angular structures of an angularity corresponding to that of said first-named angular structures, said bumper including a transverse central portion, and a shock absorber spaced from and supported by said transverse central portion for movement relative thereto in consequence of collision of said shock absorber with an external object, said shock absorber extending about said further angular structures of said bumper, said shock absorber comprising an arcuate portion extending continuously from end to end of said shock absorber, the curvature of said arcuate portion extending in directions transversely of said car, a pressure-operated signal means interposed between said arcuate portion of said shock absorber and said transverse central portion of said bumper, said signal means being adapted to give a signal upon the occurrence of said movement of said shock absorber in consequence of said collision.

2. A passenger car according to claim 1, wherein said shock absorber comprises metallic wall means defining a hollow space, said pressure-operated signal means comprising a hollow container member and a whistle member mounted in a wall of said hollow container member, said container member being enclosed on three sides thereof by said wall means, said container member being compressed upon the occurrence of said movement of said shock absorber and thereby forcing the air in said container member through said whistle member to produce said audible signal.

References Cited by the Examiner

UNITED STATES PATENTS

| | | | |
|---|---|---|---|
| 1,096,609 | 5/14 | Dodge | 293—51 |
| 1,195,883 | 8/16 | Wells | 116—34 |
| 1,496,112 | 6/24 | Banschbach | 293—85 |
| 1,570,624 | 1/26 | Domunguez | 293—71 |
| 1,690,961 | 11/28 | Yoshinaga | 293—71 |
| 2,120,459 | 6/38 | Brown | 293—86 |
| 2,144,357 | 1/39 | Booharin | 293—51 |
| 2,788,998 | 4/57 | Wilfert | 293—62 |

FOREIGN PATENTS

| | | |
|---|---|---|
| 1,070,577 | 2/54 | France. |
| 1,095,808 | 12/54 | France. |

LOUIS J. CAPOZI, *Primary Examiner.*

LEO SMILOW, *Examiner.*